(12) United States Patent
Vaccarello et al.

(10) Patent No.: US 11,630,978 B2
(45) Date of Patent: Apr. 18, 2023

(54) METAL CHIP CARD WITH DUAL COMMUNICATION INTERFACE

(71) Applicant: Smart Packaging Solutions, Rousset (FR)

(72) Inventors: Lea Vaccarello, Rousset (FR); Guillaume Gerin, Rousset (FR); Stephan Danler-Baumgartner, Rousset (FR)

(73) Assignee: SMART PACKAGING SOLUTIONS, Rousset (FR)

( * ) Notice: Subject to any disclaimer, the term of this patent is extended or adjusted under 35 U.S.C. 154(b) by 0 days.

(21) Appl. No.: 17/295,063

(22) PCT Filed: Dec. 6, 2019

(86) PCT No.: PCT/FR2019/000203
§ 371 (c)(1),
(2) Date: May 19, 2021

(87) PCT Pub. No.: WO2020/115375
PCT Pub. Date: Jun. 11, 2020

(65) Prior Publication Data
US 2022/0083830 A1  Mar. 17, 2022

(30) Foreign Application Priority Data
Dec. 7, 2018 (FR) ...................... 18 72550

(51) Int. Cl.
*G06K 19/04* (2006.01)
*G06K 19/07* (2006.01)

(52) U.S. Cl.
CPC ....... *G06K 19/041* (2013.01); *G06K 19/0702* (2013.01); *G06K 19/0723* (2013.01)

(58) Field of Classification Search
CPC .................... G06K 19/041; G06K 19/0702
(Continued)

(56) References Cited

U.S. PATENT DOCUMENTS 9,747,539 B1 * 8/2017 Kendall ........... G06K 19/07722
2008/0072423 A1 * 3/2008 Finn ................. G06K 19/07327
29/857

(Continued)

FOREIGN PATENT DOCUMENTS

| EP | 0646895 A2 | 4/1995 |
|----|-----------|--------|
| EP | 2073154 A1 | 6/2009 |
| FR | 3032294 A1 | 8/2016 |

OTHER PUBLICATIONS

International Search Report (PCT/ISA/210) and Written Opinion (PCT/ISA/237) dated Jun. 26, 2020, by the European Patent Office as the International Searching Authority for International Application No. PCT/FR2019/000203.

*Primary Examiner* — Allyson N Trail
(74) *Attorney, Agent, or Firm* — Buchanan Ingersoll & Rooney PC (57) ABSTRACT

The invention relates to a chip card with a dual, contactless and contact-based communication interface, comprising a card body made up of two metal sheets and an electronic module provided with a terminal block and an antenna designed for radio-frequency communication with the antenna of a remote reader. The electronic module includes an active communication circuit powered by a battery in the chip card, and configured to generate a carrier signal capable of interacting with the carrier signal emitted by a remote contactless reader in order to establish active radio-frequency communication between the chip card and the remote reader.

13 Claims, 7 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2013/0243436 A1* | 9/2013 | Kargl | H04B 10/1143 |
| | | | 398/115 |
| 2014/0273830 A1 | 9/2014 | Wong et al. | |
| 2016/0019449 A1* | 1/2016 | Auten | G06K 19/06206 |
| | | | 235/492 |
| 2017/0017871 A1 | 1/2017 | Finn et al. | |
| 2019/0311236 A1* | 10/2019 | Sexl | G06K 19/07771 |

* cited by examiner

METAL CHIP CARD WITH DUAL COMMUNICATION INTERFACE

The present invention relates to a chip card with dual, contact and contactless, communication interface, provided with a card body mainly made of metal.

PRIOR ART

In the field of chip cards, in particular those used for banking applications, some of the demand tends to be focused, for reasons of better handling and differentiation, on cards that are heavier than conventional chip cards with a body made of plastic material.

Some of the known chip cards have a metal layer on only one face of the card, the other face not being covered with metal but provided with an antenna allowing communication with a remote reader by radiofrequency. However, due to the shielding effect of the metallic layer, the radiofrequency communication is impaired, in particular when the metal face of the card is facing the reader. In particular, tests have shown that with this type of chip card, it was impossible to comply with certain standards such as those dictated by the EMVCo specifications which dictate mechanical, electrical and radiofrequency communication quality requirements.

In order to remedy this problem and maintain good quality of radiofrequency communication regardless of the orientation of the chip card relative to the remote reader, it has been proposed, in document FR3032294 A1, to construct the chip card using a metal insert placed between two outer sheets each provided with an antenna and with a ferrite layer. This arrangement makes it possible to maintain good quality of communication as required by EMVCo-type specifications, but the process for producing this type of card is relatively complex and expensive. In addition, in this embodiment, the metal insert is located between outer layers of the card made of plastic material and is therefore not directly visible from the outside, which does not contribute to creating a sufficiently different perception with respect to cards made entirely of plastic material.

Document EP 2 073 154 A1 describes a chip card the card body of which is not made of metal, and the electronic module of which inside the card body is provided with a battery in order to be able to supply power to a biometric sensor, such as a fingerprint sensor, integrated into the chip card. The desired objective is to be able to perform biometric identity tests directly on the chip card, without depending on radiofrequency communication with a remote reader, in order to save time in transactions. The presence of this battery has no relation to and no effect on the mode of communication with the remote contactless reader.

OBJECT OF THE INVENTION

One object of the invention is to provide a novel structure of a chip card with a metal body and dual, contact and contactless, communication interface which has a contactless communication interface that is modified so that it is able to communicate in contactless mode according to the requirements of EMVCo-type specifications regardless of which face of the card is presented to the field of the reader, while maintaining a simple structure that is easy to produce.

Another object of the invention is to provide a chip card that has a mainly metal card body capable of providing a significant difference in perception with respect to the known cards made of plastic material. This difference involves in particular the need to obtain a relatively heavy card, which has metal on the surface and on the edge, and makes a "metallic" noise when it is thrown onto the surface of a table or the like.

SUBJECT OF THE INVENTION

In principle, the invention consists in providing the chip card with a mainly metal body, with the exception of a location reserved for the microelectronic module, and in providing the module with an antenna and with an active communication circuit that is supplied with power by a battery placed in a cavity made in the card body.

To that end, the card body is made from two metal plates with ISO 7816-1 dimensions, provided with through-cutouts intended to accommodate the microelectronic module, and blind cutouts forming a cavity intended to accommodate a battery.

One subject of the invention is therefore a chip card with dual, contact and contactless, communication interface, comprising a card body comprising two metal sheets and an electronic module provided with a contact terminal block and with an antenna intended for radiofrequency communication with the antenna of a remote reader, characterized in that the electronic module comprises an active communication circuit supplied with power by a battery located in the chip card and configured to generate a carrier signal capable of interacting with the carrier signal emitted by a remote contactless reader so as to establish an active radiofrequency communication between the chip card and said remote reader.

In this way, the shielding effect of the metal layers is compensated for and communication between the reader and the chip card is no longer dependent on the low amplitude of the carrier of the reader which would otherwise be decreased by the chip card due to the presence of the metal sheets.

According to one embodiment of the invention, the active communication circuit, when it is placed in the vicinity of the reader, emits a carrier of the same frequency as that of the reader, which may be out of phase or otherwise with respect to the carrier of the reader and cause a change in the voltage across the terminals of the antenna of the reader so as to communicate information between the reader and the chip card.

In the embodiment described above, the active communication circuit has a number of ways of communicating with the reader. One way is to emit an electromagnetic field at the same carrier frequency as the reader and in phase with the carrier of the reader in order to encode a high modulation state (corresponding to a binary "1"), and to emit an electromagnetic field at the same carrier frequency as the reader and in phase opposition with the carrier of the reader in order to encode a low modulation state (corresponding to a binary "0").

According to one preferred embodiment of the invention, the card body comprises two metal sheets between which is arranged said battery supplying said active communication circuit with power.

According to one embodiment, at least one of the metal sheets is provided with a cavity able to accommodate said battery.

According to another embodiment, the metal sheets are each provided with a blind cavity, the two blind cavities being located facing one another and able to accommodate said battery.

In addition, the two metal sheets comprise two through-cavities located facing one another and able to accommodate the microelectronic module.

According to one advantageous embodiment, the area of the two metal sheets is greater than or equal to 90% of the total outer area of the chip card.

According to one embodiment, the terminals of the battery are connected to power supply pads located on the electronic module, via conductive tracks arranged on the inner face of one of the two metal sheets.

According to one embodiment, the metal sheets have a thickness of about 400 micrometers.

According to one embodiment, the two metal sheets are made of stainless steel or of a metal alloy.

In order to avoid short circuits, the chip card comprises a layer of electrically insulating resin or a layer of insulating lacquer arranged between the two metal sheets.

According to one advantageous embodiment, the circuit is provided with diodes allowing the battery to be charged via the contacts of the module when the chip card is inserted into a contact chip card reader.

Another subject of the invention is a process for producing a chip card as described, characterized in that it comprises steps consisting in:
- Cutting out two metal sheets in ISO 7816-1 chip card format;
- Machining through-openings at the installation location intended for the electronic module;
- Machining blind cavities at the location on each metal sheet intended for accommodating an electric battery;
- Interposing an electrical insulator between the two metal sheets, for example by deposition on one of the inner faces of the metal sheets;
- Placing the battery in the blind cavity in one of the metal sheets;
- Adding conductive tracks and connecting them between the terminals of the battery and the power supply pads of the module using, for example, an anisotropic conductive film;
- Adding and bonding the upper metal sheet to the lower metal sheet;
- Adding and bonding the electronic module into the cavity in the upper metal sheet.

DETAILED DESCRIPTION

The invention will be described in more detail with the aid of the figures, in which.

Figure 1:
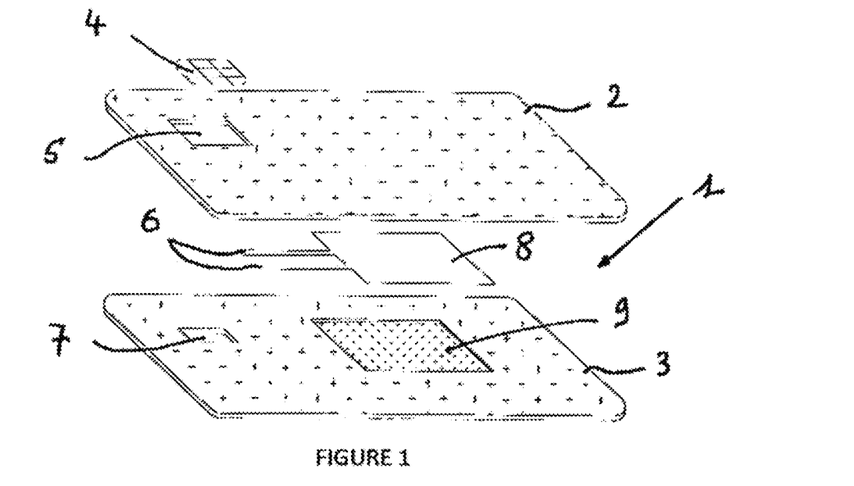
FIG. 1 shows an exploded perspective view of a chip card according to the invention.

FIG. 1 shows an exploded perspective of a chip card 1 according to the invention. It comprises two metal sheets 2, 3, in particular in the format corresponding to ISO standard 7816-1. By convention, the upper sheet will be the sheet 2 that comprises a through-cavity 5 accommodating the electronic module 4, the cavity 5 having the size of the terminal block of the module. To comply with the standards in force in the field of chip cards, the two metal sheets 2, 3 each have a thickness of about 400 micrometers.

Figure 2:
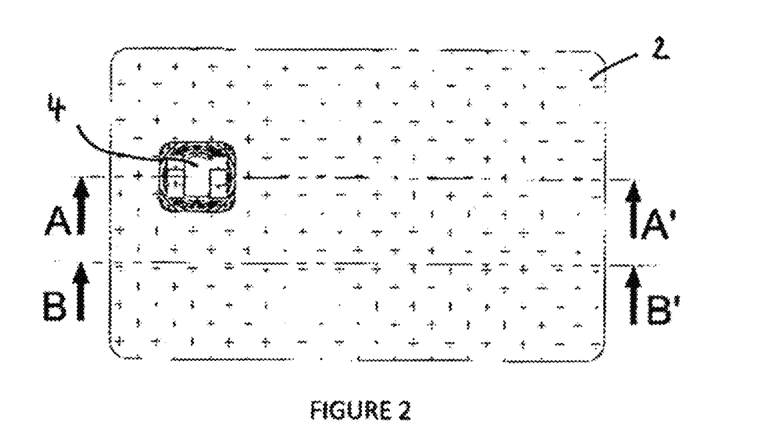
FIG. 2 shows a top view, module terminal block side, of a chip card according to the invention.

As can be seen in FIG. 2 corresponding to a top view of the chip card, the electronic module 4 comprises, on its visible surface, a terminal block with standardized contacts, intended for connection with the corresponding contacts of a chip card reader, as is well known in the field of chip cards.

Figure 5:
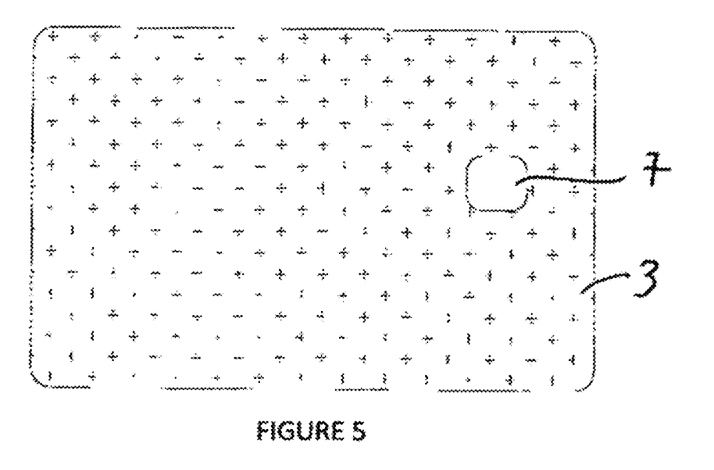
FIG. 5 shows a top view of the lower sheet outer face of the body of the chip card according to the invention.

As can be seen in FIG. 5, the lower sheet 3 is provided with a smaller, through-cavity 7 which accommodates the lower portion of the module 4 which is provided with an antenna 12 intended for communication with the antenna of a remote reader.

Figure 3:
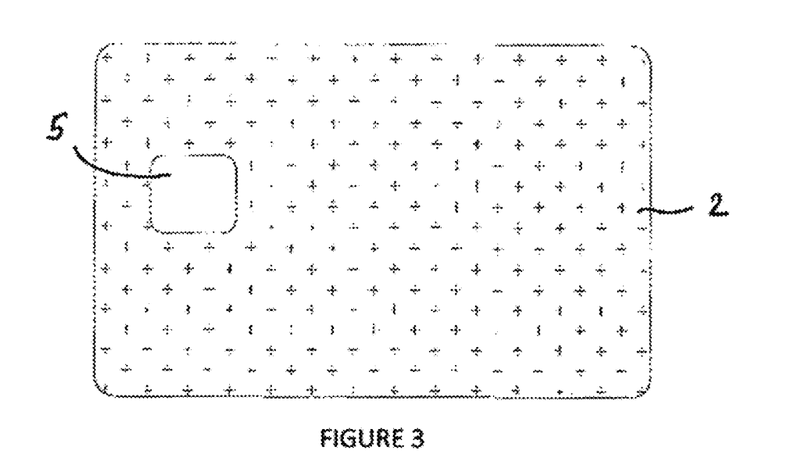
FIG. 3 shows a top view of the upper sheet outer face of the body of the chip card according to the invention.
Figure 4:
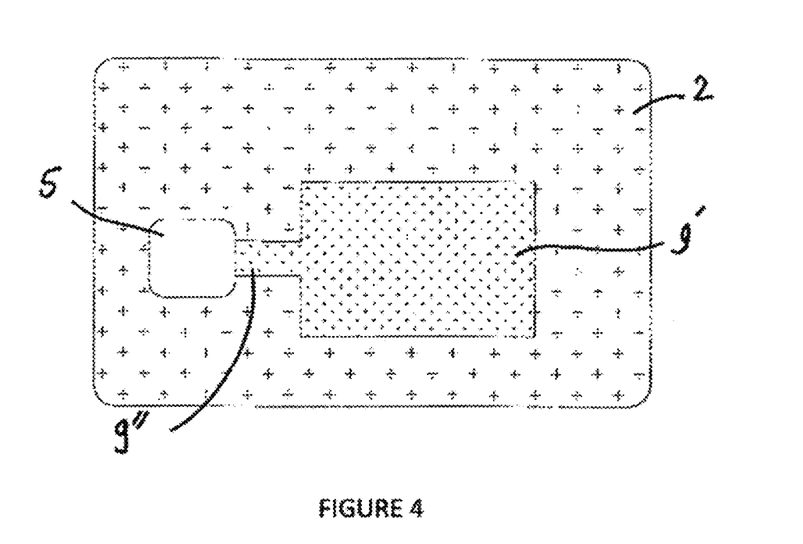
FIG. 4 shows a bottom view of the upper sheet inner face.

FIGS. 3 and 4 respectively show the outer and inner face of the upper metal sheet 2. As can be seen, most of the area of the sheet 2, i.e. about 90%, is made of solid metal. The outer face of the sheet 2 simply comprises a through-opening 5 intended to accommodate the upper face of the electronic module 4 (not shown in FIG. 3). The inner face of the metal sheet 2 (FIG. 4) comprises a blind cavity 9' homologous with the cavity 9 in the lower sheet 3, intended to accommodate a portion of the thickness of the battery 8 (not shown in FIG. 4). The cavity 9' is extended by a portion of the blind cavity 9" which is intended to allow passage of the conductive tracks 6 that allow the terminals of the battery 8 to be connected to the power supply pads of the electronic module 4. The cavity 9" opens into the cavity 5 intended to accommodate the module 4.

Figure 6:
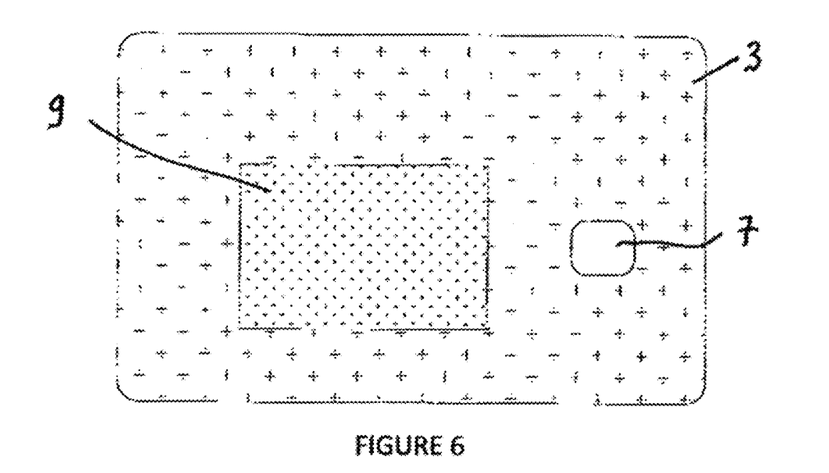
FIG. 6 shows a bottom view of the lower sheet inner face.

FIGS. 5 and 6 respectively show the outer and inner face of the lower metal sheet 3. Here again, most of the area of the sheet 3, i.e. about 90%, is made of solid metal. The outer face of the sheet 3 simply comprises a through-opening 7 intended to accommodate the lower face of the electronic module 4 (not shown in FIG. 5). The portion of the cavity 7 not filled with the lower portion of the module 4 may be filled with an electrically insulating material, for example a resin. The inner face of the metal sheet 3 comprises a blind cavity 9, intended to accommodate a portion of the thickness of the battery 8 (not shown in FIG. 6). The cavities 9 and 7 do not need to be connected, given that the connection tracks 6 from the battery 8 to the module 4 are arranged, in the example shown, on the inner face of the upper metal sheet 2.

Figure 7:
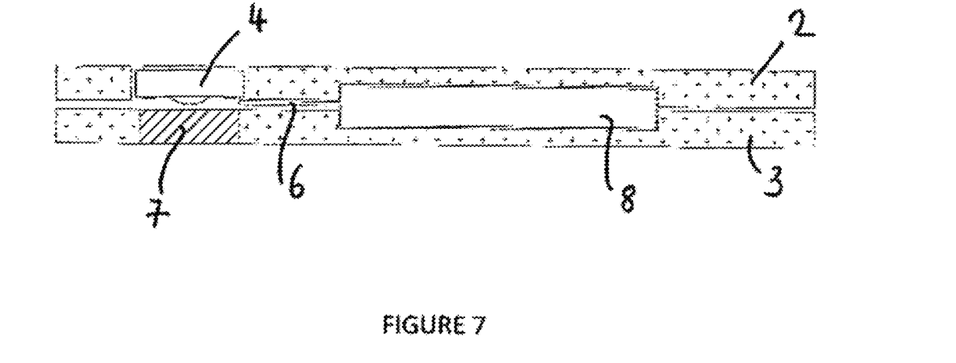
FIG. 7 shows a longitudinal sectional view of the chip card according to the invention along the sectional plane A-A' of FIG. 2.

In FIG. 7, the chip card of FIG. 2 is shown in longitudinal sectional view along the sectional plane A-A' passing through the module 4. The thickness of the card is exaggerated for better visibility. As can be seen, the battery 8 is connected by the metal tracks 6 to the power supply terminals of the module 4.

Figure 8:
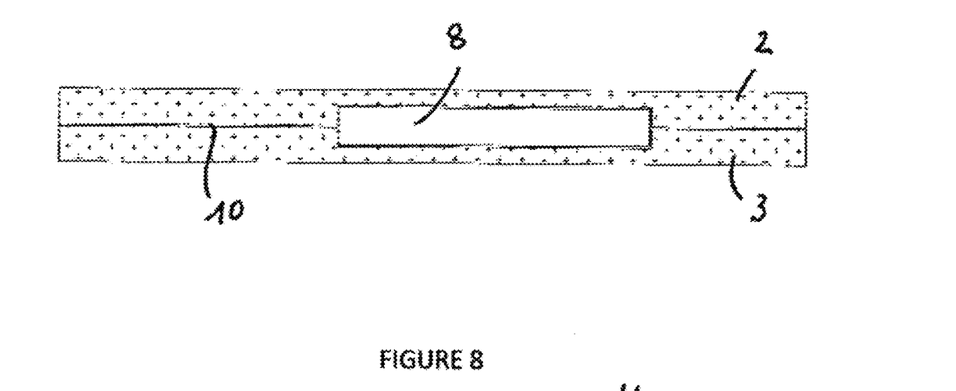
FIG. 8 shows a longitudinal sectional view of the chip card according to the invention along the sectional plane B-B' of FIG. 2.

FIG. 8 shows a similar section through the chip card, but along the sectional plane B-B' of FIG. 2, not passing through the module 4.

A very thin layer of insulating adhesive or resin (not shown) is interposed between the inner faces of the metal sheets 2, 3, in order to prevent the shorting of the + and − terminals of the battery.

Figure 9:
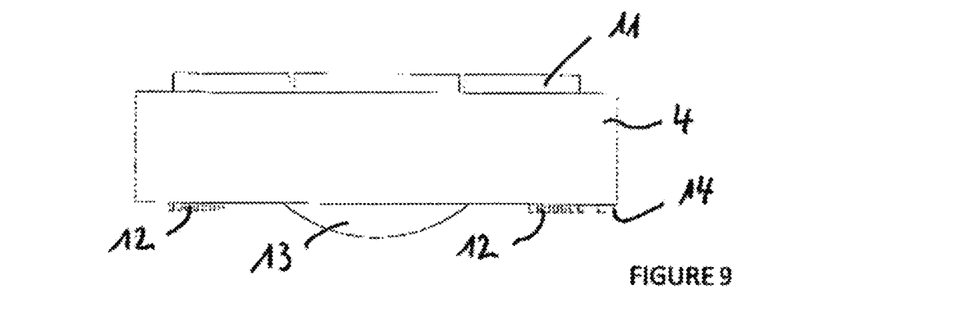
FIG. 9 shows an enlarged cross-sectional view of the module of the chip card.

FIG. 9 shows an enlarged sectional side view of the electronic module 4, showing in particular the standardized contacts 11 of the terminal block that is located on the upper face of the module, the turns of the antenna 12 that is located on the lower face of the module, and a blob 13 of coating resin protecting the electronic components of the module, as known per se. Also shown is a contact terminal 14 intended to be connected to one of the tracks 6 connecting to the battery 8.

Figure 10:
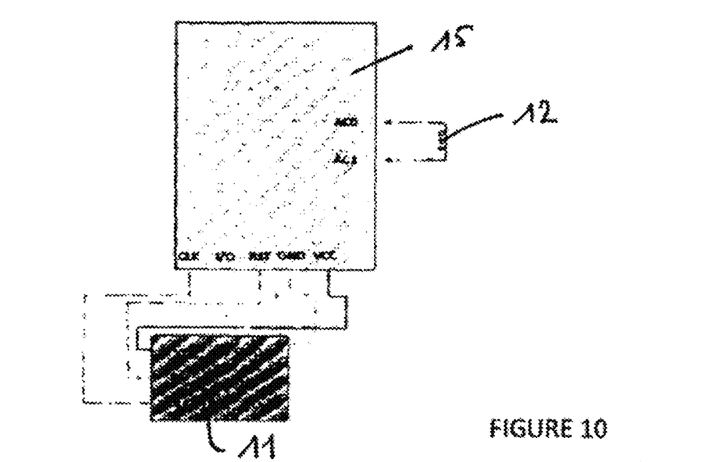
FIG. 10 shows a block diagram of the circuits of a passive chip card according to the prior art.

FIG. 10 summarizes the circuit diagram of the components of a passive chip card in accordance with the prior art. The module comprises a contact terminal block 11 connected to a microprocessor chip card component 15. The passive component 15 is connected to an antenna 12 that makes it possible to capture, typically via a "booster" amplification antenna (not shown), the electromagnetic flux coming from the remote reader, which allows the component 15 to be supplied with the electrical power required to operate and to communicate with the reader. For this purpose, the booster antenna must be of large size, typically the size of the card body, and under these conditions it is not possible for the card body to have sheets made of metal covering the one or more antennas, since these sheets would constitute a shield which would make effective radiofrequency communication between the contactless card and the reader impossible.

Figure 11:
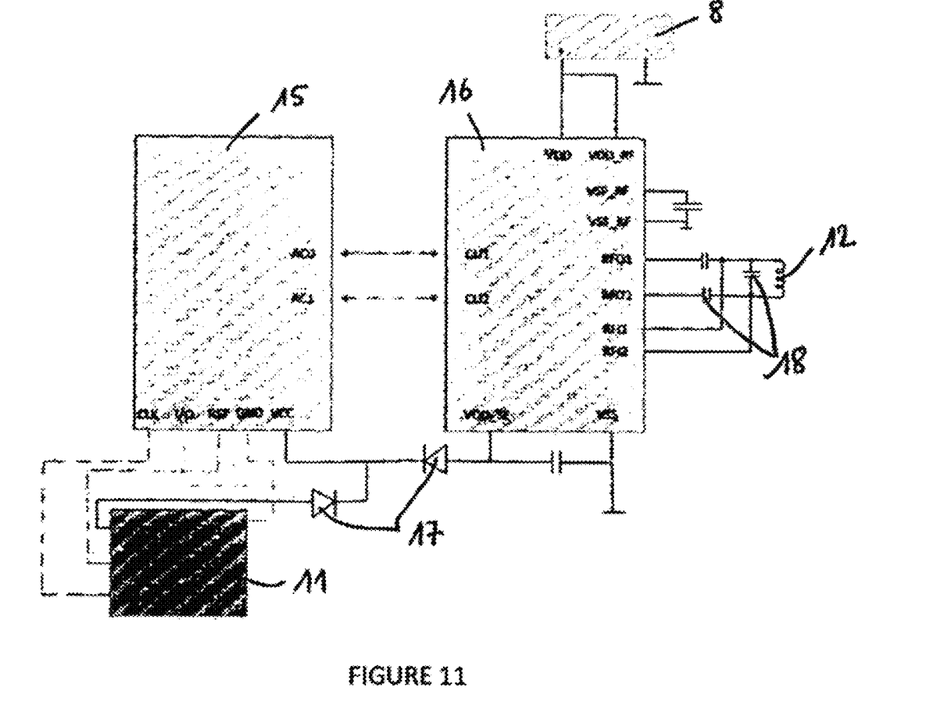
FIG. 11 shows a block diagram of the circuits of the chip card according to the invention.

To remedy this, the invention proposes a novel module corresponding to the circuit diagram of FIG. 11. In this diagram, a microprocessor chip card component 15, known per se, is connected to a radiofrequency communication stage composed of an active component 16 the purpose of which is to transform the signal of a chip card 15 into an active radiofrequency signal allowing upward and downward communication with a remote radiofrequency reader.

Unlike the known chip cards comprising a metal insert placed between two outer sheets made of plastic material, the chip card according to the invention comprises a battery 8 intended for supplying power to the radiofrequency communication circuit 16 of the module 4.

More precisely, the battery 8 serves to supply electrical power to a communication circuit 16, which is able to supply a conventional chip 15 with power and to transform the passive signal of this conventional chip 15 via its contactless interface, in order to carry out active communication with a remote contactless reader. This makes it possible not to be dependent on the low amplitude of the carrier of the reader which would be attenuated by the conventional chip card due to the presence of the metal sheets.

According to one embodiment of the invention, the metal chip card emits a carrier of the same frequency as that of the reader. The carrier emitted by the communication circuit 16 via the communication antenna 12 of the chip card is in phase or in phase opposition with the carrier signal emitted by the reader, in order to encode a high modulation state or a low modulation state.

The carrier emitted in active mode by the novel chip card in the vicinity of the reader (in practice the distance between reader and chip card is less than 10 centimeters) will change the voltage across the terminals of the antenna of the reader, and this change allows data to be communicated between the reader and the metal chip card.

Consequently, the mode of communication between the chip card and the reader is said to be active, as opposed to the conventional mode of communication which is passive in the sense that only the reader emits a carrier signal which is picked up by the contactless chip card. The conventional arrangement works when the chip card has a card body made of plastic material, but is no longer suitable for a chip card the card body of which is mainly metal and creates an electromagnetic shielding effect.

The battery 8 is connected to the radiofrequency communication circuit 16 of the module 4 by conductive tracks 6. The thickness of the battery 8 is low, but its integration nevertheless requires the formation of cavities in the metal sheets, for the insertion of the battery 9. It may be a single cavity made in one of the two metal sheets, or two cavities 9, 9', preferably blind cavities, distributed in the inner face of each of the metal sheets 2, 3.

The component 16 is supplied with power by the battery 8, unlike the passive circuits of the known contactless chip cards, which are supplied with power remotely by the energy from the reader. The active component 16 is connected at output to the module antenna 12 which is provided with a matching circuit composed of capacitors. The antenna 12 is an antenna of small size which is sufficient to obtain good radiofrequency communication quality, given the direct battery power supply. The other electronic components 18 connected to the component 16 are mainly "decoupling" capacitors, necessary for stabilizing the electrical power supply of the component.

Advantageously, the electronic module is also provided with diodes 17 allowing the battery 8 to be charged via the contacts 11 when the chip card is inserted into a contact chip card reader.

Figure 12:
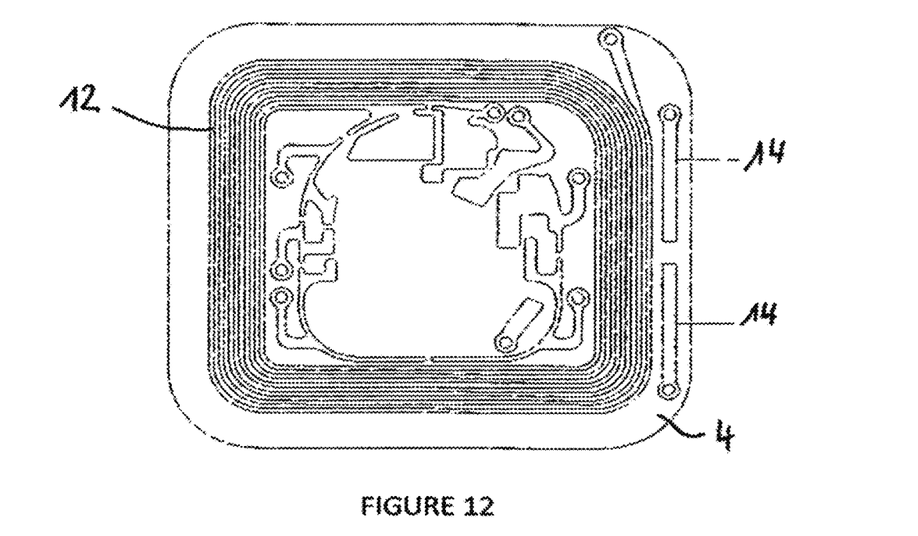
FIG. 12 shows a view of the module of the chip card, from the antenna side.

FIG. 12 shows a practical embodiment of the lower face of the module 4, provided with the antenna 12, and the power supply terminals 14 that are intended to be connected to the tracks 6 going to the battery.

Figure 13:
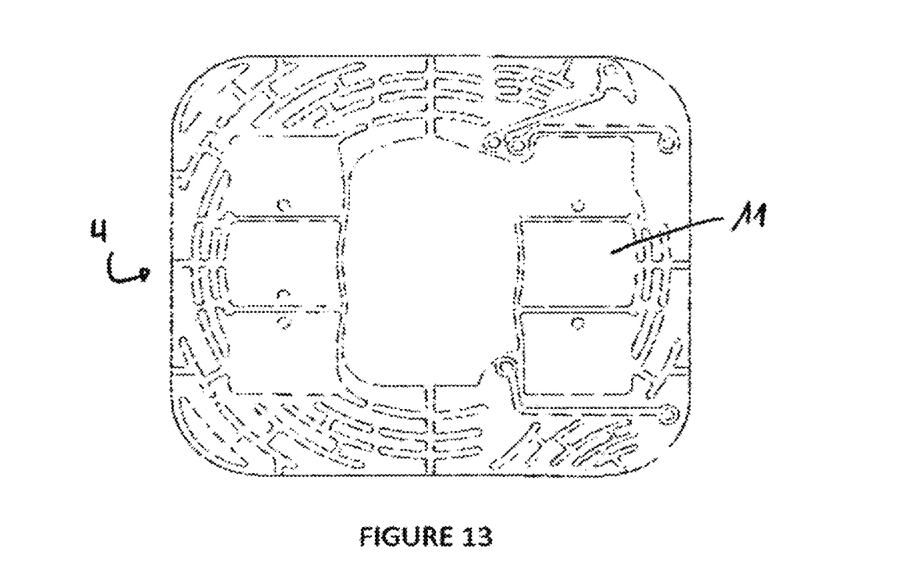
FIG. 13 shows a view of the module of the chip card, from the terminal block contact side.

FIG. 13 shows a practical embodiment of the upper face of the module 4, in particular with the contacts 11 of the terminal block according to ISO standard 7816.

Figure 14:
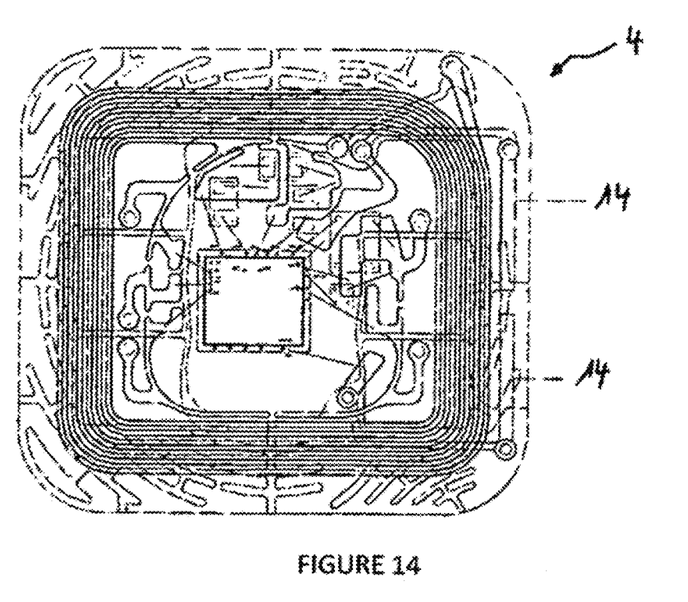
FIG. 14 shows a transparent view of the module containing all of the electronic components of the active circuit.

FIG. 14 shows the module 4 in bottom view (antenna side), with a transparent view (lighter line) of the contacts on the upper face of the module.

Figure 15:
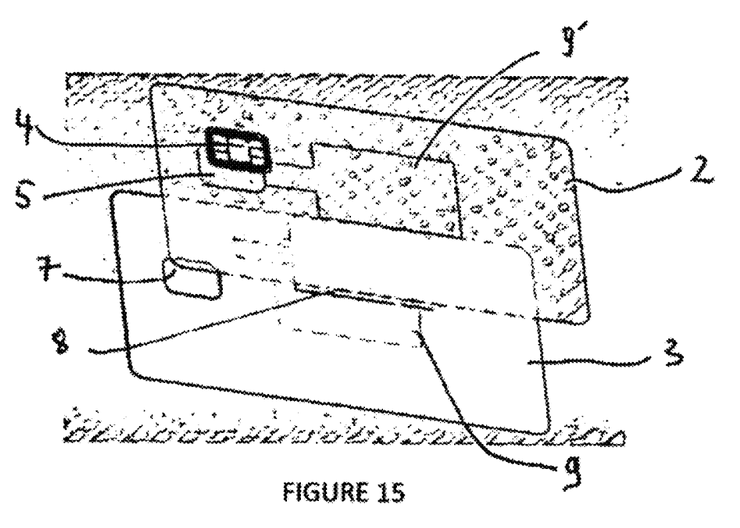
FIG. 15 shows a schematic view of the steps of the process for producing the elements of the chip card.

FIG. 15 schematically illustrates the steps of the process for assembling the elements of the chip card. It takes place as follows:

Cutting out two metal sheets in ISO 7816-1 chip card format;

Machining through-openings 5, 7 at the installation location intended for the electronic module 4;

Machining blind cavities 9, 9' at the location on each metal sheet 2, 3 intended for accommodating an electric battery 8;

Interposing an electrical insulator between the two metal sheets, for example by deposition on one of the inner faces of the metal sheets;

Placing the battery 8 in the blind cavity 9 in one of the metal sheets 2, 3;

Adding conductive tracks 6 and connecting them between the terminals of the battery 8 and the power supply pads of the module 4 using an anisotropic conductive film;

Adding and bonding the upper metal sheet 2 to the lower metal sheet 3;

Adding and bonding the electronic module 4 into the cavity 5 in the upper metal sheet 2.

ADVANTAGES OF THE INVENTION

The invention achieves the objectives set. Tests show that radiofrequency communication with a reader is of good quality regardless of the orientation of the card, and complies with EMVCo specifications.

The metal faces are solid, without compromising radiofrequency communication quality. They provide an attractive appearance, and good handling.

The production of the metal sheets and the assembly of the components is simple and inexpensive.

Ultimately, the chip card according to the invention works in the same way as a card made of plastic material but, by virtue of the active communication mode, fully complies with the contactless EMVCo standard.

The invention claimed is:

1. A chip card with dual, contact and contactless, communication interface, comprising a card body comprising two metal sheets and an electronic module provided with a contact terminal block and with an antenna for radiofrequency communication with an antenna of a remote reader, wherein the electronic module comprises an active communication circuit supplied with power by a battery located in the chip card and configured to generate a carrier signal capable of interacting with the carrier signal emitted by a remote contactless reader so as to establish an active radiofrequency communication between the chip card and said remote reader;

and wherein the metal sheets are each provided with a blind cavity, the two blind cavities being located facing one another and able to accommodate said battery.

2. The chip card as claimed in claim 1, wherein the active communication circuit is configured to emit an electromagnetic field at the same carrier frequency as the reader and in phase with the carrier of the reader in order to encode a high modulation state (corresponding to a binary "1"), and to emit an electromagnetic field at the same carrier frequency as the reader and in phase opposition with the carrier of the reader in order to encode a low modulation state (corresponding to a binary "0").

3. The chip card as claimed in claim 1, wherein the two metal sheets comprise two through-cavities, located facing one another and able to accommodate the electronic module.

4. The chip card as claimed in claim 1, wherein the terminals of the battery are connected to power supply pads located on the electronic module, via conductive tracks arranged on the inner face of one of the two metal sheets.

5. The chip card as claimed in claim 1, wherein the metal sheets have a thickness of about 400 micrometers.

6. The chip card as claimed in claim 1, wherein the two metal sheets are made of stainless steel or of an alloy.

7. The chip card as claimed in claim 1, comprising a layer of electrically insulating resin or of insulating lacquer, arranged between the two metal sheets.

8. The chip card as claimed in claim 1, wherein the active communication circuit is provided with diodes allowing the battery to be charged via the contacts of the module when the chip card is inserted into a contact chip card reader.

9. A process for producing the chip card as claimed in claim 1, comprising:
Cutting out two metal sheets in ISO 7816-1 chip card format;
Machining, into the metal sheets, through-openings at an installation location intended for the electronic module;
Machining blind cavities at the location on each metal sheet intended for accommodating the battery;
Interposing an electrical insulator between the two metal sheets, by deposition on one of the inner faces of the metal sheets;
Placing the battery in the blind cavity in one of the metal sheets;
Adding conductive tracks and connecting them between the terminals of the battery and power supply pads of the module using an anisotropic conductive film;
Adding and bonding an upper metal sheet of the metal sheets to a lower metal sheet of the metal sheets; and
Adding and bonding the electronic module into the cavity in the upper metal sheet.

10. A chip card with dual, contact and contactless, communication interface, comprising a card body comprising two metal sheets and an electronic module provided with a contact terminal block and with an antenna for radiofrequency communication with an antenna of a remote reader, wherein the electronic module comprises an active communication circuit supplied with power by a battery located in the chip card and configured to generate a carrier signal capable of interacting with the carrier signal emitted by a remote contactless reader so as to establish an active radiofrequency communication between the chip card and said remote reader;

and wherein the area of the two metal sheets is greater than or equal to 90% of the total outer area of the chip card.

11. The chip card as claimed in claim 10, wherein at least one of the metal sheets is provided with a cavity able to accommodate said battery.

12. The chip card as claimed in claim 11, wherein the metal sheets are each provided with a blind cavity, the two blind cavities being located facing one another and able to accommodate said battery.

13. A chip card with dual, contact and contactless, communication interface, comprising a card body comprising two metal sheets and an electronic module provided with a contact terminal block and with an antenna for radiofrequency communication with an antenna of a remote reader, wherein the electronic module comprises an active communication circuit supplied with power by a battery located in the chip card and configured to generate a carrier signal capable of interacting with the carrier signal emitted by a remote contactless reader so as to establish an active radiofrequency communication between the chip card and said remote reader;

and wherein the terminals of the battery are connected to power supply pads located on the electronic module, via conductive tracks arranged on the inner face of one of the two metal sheets.

* * * * *